(No Model.)

S. DE GAETANO.
BILLIARD CUSHION.

No. 457,529. Patented Aug. 11, 1891.

WITNESSES:
Samuel H. Baxter
A. Wahlberg

INVENTOR:
Stephen de Gaetano

# UNITED STATES PATENT OFFICE.

STEPHEN DE GAETANO, OF LONG ISLAND CITY, NEW YORK.

BILLIARD-CUSHION.

SPECIFICATION forming part of Letters Patent No. 457,529, dated August 11, 1891.

Application filed March 5, 1890. Serial No. 342,769. (No model.)

*To all whom it may concern:*

Be it known that I, STEPHEN DE GAETANO, a citizen of the United States, and a resident of Long Island City, in the county of Queens and State of New York, have invented a new and useful Improvement in Billiard-Cushions, of which the following is a specification.

My invention relates to that class of rubber cushions for billiard-tables, in which strips of textile fabric are placed along the working-surface to increase the rebounding effect on the balls and lessen their liability to jump.

The object of my improvement is to increase the elasticity of billiard-cushions, and more especially to make said elasticity uniform at all parts of the cushion, so as thereby to correct the "angle of the table," as it is termed—that is to say, to improve the capacity or tendency of the cushion to repel the balls at an angle more exactly equal to the angle of concussion.

The invention consists in the combination, with the rubber cushion of a billiard-table, of one or more strips of hair-cloth applied upon the face or working-surface of the cushion, as will be hereinafter more fully described and claimed, reference being had to the accompanying drawings, in which—

Figure 1:
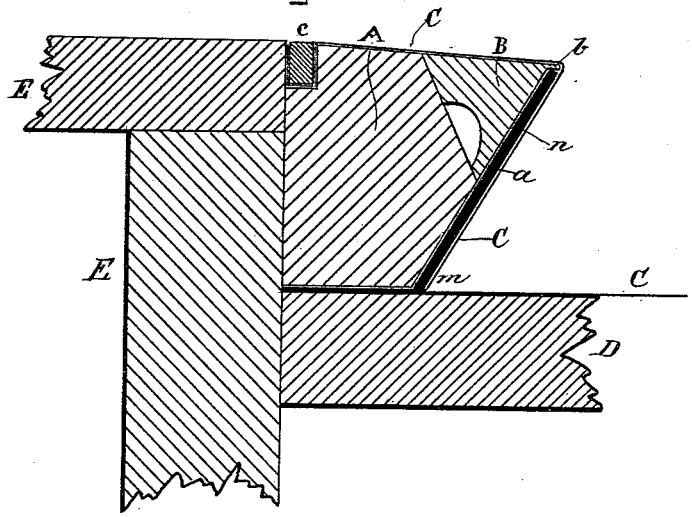
Figure 2:
Figure 3:
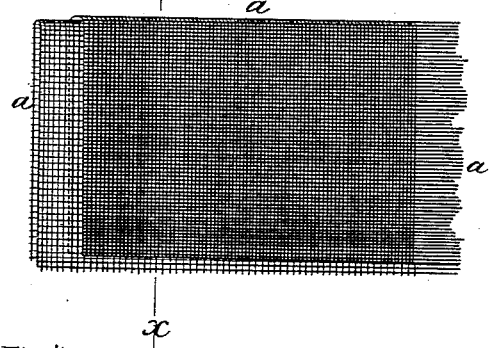
Figure 4:
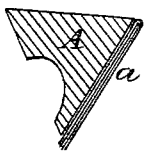

Figure 1 represents a vertical section of a billiard-cushion provided with my present improvement. Fig. 2 is a vertical or cross section of the hair-cloth strip, taken on the line $x\,x$ of Fig. 3. Fig. 3 represents a portion of the strip of hair-cloth shown as being composed of a folded strip of two layers of cloth. Fig. 4 is a detail cross-section of the rubber strip of the cushion having the hair-cloth facing arranged in a slightly-modified manner from that shown in Fig. 1.

In my invention described in Patent No. 261,812, dated July 25, 1882, one or more strips of hair-cloth are embedded in the rubber cushion, and if embedded evenly—that is to say, so that the upper edge of the strip is entirely straight and parallel with the working edge of the rubber cushion—it accomplishes very well the purpose stated in that patent. I have, however, found by experience that at least with the present means for molding rubber it is impossible to thus properly embed the strip, the edge of which forms a very uneven and undulating line. Hence the angle of the table becomes imperfect, the ball at one point striking only the rubber, at another the rubber-covered hair-cloth, and at a third a curve of the uneven edge of the latter. Therefore to obviate this difficulty and get the benefit of the superior elastic effect of the hair-cloth I have made this present improvement, by which its proper location relative to the edge of the rubber cushion is secured, being independent of the molding of the rubber and completely controllable.

In the drawings, A designates the wooden rail of the cushion; B, the rubber cushion proper; C, the cloth covering secured by strips $c$ in the usual manner.

D is a part of the slate table.

E is a side rail of the table.

The inside or face of the cushion is covered with one or more strips of hair-cloth. The strip is made by taking one or more thicknesses (preferably two, which have proven sufficient) and folding them as shown in Figs. 2 and 3, after which the four thicknesses of the cloth in the strip $a$ thus formed are glued or cemented together, then firmly pressed to form, as it were, one solid sheet or plate. The folding is made along the warp of the cloth, (thus enabling a strip to be made of the same length as the cushion,) so that the woof or stiff hair of the cloth is placed on end or at right angles to the upper surface of the cushion. The strip so made is then glued or cemented to the wooden rail A and rubber strip B from $m$ to $n$, (see Fig. 1,) leaving the hair-cloth for about one-half-inch width above $n$ free—that is, not cemented to the rubber strip B. The strip $a$ may be so placed that its upper edge does not entirely reach the upper edge of the rubber strip B and the latter allowed to project by a thin edge to cover the upper edge of the hair-cloth, as shown at $b$, Fig. 1, or the edge of the hair-cloth strip may extend up to and flush with the upper surface of the rubber B, as shown in Fig. 4. I prefer to have the rubber overlap the edge of the strip $a$, as at $b$ in Fig. 1, whereby the smoothly-stretched cloth covering is kept from contact with the stiff edge of the hair-cloth strip and thus saved from undue wear. By not cementing to the rubber the upper part of the strip

*a* the latter is free to bend and act as a separate flat spring backed by the rubber acting by expansion after compression, the resistance is distributed over a larger surface, thus lessening the depth of compression from the impact of the ball, and the amount of the surface of the ball and cushion brought into contact, and consequently correcting the angle of the table.

It will be obvious that the folding of the cloth at the upper edges of the cushion not only makes better edges, but also gives a more powerful spring-like effect than if said edges were cut. The cementing of the lower part of the edges stiffens the cloth layers and makes the spring effect still more powerful.

What I claim as my invention is—

1. A billiard-cushion faced with one or more longitudinal strips of hair-cloth.

2. A billiard-cushion faced with one or more longitudinal strips composed of layers of hair-cloth placed with the woof or hair on end or at right angles to the edge line of the cushion.

3. A billiard-cushion having longitudinally a facing-strip composed of one or more thicknesses of hair-cloth folded together and cemented, substantially as set forth.

4. A billiard-cushion having longitudinally a facing-strip of hair-cloth cemented to the surface of said cushion except at its upper edge, substantially as specified.

5. In a billiard-cushion, the combination of a facing-strip of elastic flexible textile material cemented to the said cushion, and a rubber strip B, provided along its edge with a molded thin rib *b* of rubber overlapping the upper edge of the said facing-strip, substantially as hereinbefore set forth.

6. A billard-cushion having longitudinally a facing-strip composed of one or more thicknesses of hair-cloth cemented together, as set forth.

In testimony that I claim the foregoing as my invention I have signed my name, in presence of two witnesses, this 5th day of February, 1890.

STEPHEN DE GAETANO.

Witnesses:
  A. W. ALMQVIST,
  F. A. DOUGHERTY.